US009082006B2

(12) United States Patent
Kiriyama

(10) Patent No.: US 9,082,006 B2
(45) Date of Patent: Jul. 14, 2015

(54) IMAGE FORMING APPARATUS, IMAGE FORMING SYSTEM, AND IMAGE FORMING APPARATUS CONTROL METHOD

(71) Applicant: Konica Minolta, Inc., Chiyoda-ku (JP)

(72) Inventor: Tomohiro Kiriyama, Kofu (JP)

(73) Assignee: KONICA MINOLTA, INC., Chiyoda-ku, Tokyo (JP)

(*) Notice: Subject to any disclaimer, the term of this patent is extended or adjusted under 35 U.S.C. 154(b) by 0 days.

(21) Appl. No.: 14/244,192

(22) Filed: Apr. 3, 2014

(65) Prior Publication Data

US 2014/0300918 A1 Oct. 9, 2014

(30) Foreign Application Priority Data

Apr. 5, 2013 (JP) ................................. 2013-079065

(51) Int. Cl.
G06F 15/00 (2006.01)
G06K 9/00 (2006.01)
B42C 19/08 (2006.01)
G06K 15/00 (2006.01)
H04N 1/00 (2006.01)

(52) U.S. Cl.
CPC ............ *G06K 9/00442* (2013.01); *B42C 19/08* (2013.01); *G06K 15/00* (2013.01); *H04N 1/0005* (2013.01); *H04N 1/00015* (2013.01); *H04N 1/0032* (2013.01); *H04N 1/00037* (2013.01); *H04N 1/00047* (2013.01); *H04N 1/00058* (2013.01); *H04N 1/00082* (2013.01); *H04N 1/00347* (2013.01); *H04N 1/00413* (2013.01); *H04N 2201/0081* (2013.01); *H04N 2201/0091* (2013.01); *H04N 2201/0098* (2013.01)

(58) Field of Classification Search
CPC .................... H04N 1/2376; G06K 9/00442
USPC ............................... 358/1.13–1.15
See application file for complete search history.

(56) References Cited

U.S. PATENT DOCUMENTS

2007/0280711 A1* 12/2007 Yoshimura et al. ............ 399/45

FOREIGN PATENT DOCUMENTS

JP 2005-331669 A 12/2005
JP 2007-43489 A 2/2007

(Continued)

OTHER PUBLICATIONS

Office Action issued on Mar. 3, 2015, by the Japanese Patent Office in corresponding Japanese Patent Application No. 2013-079065, and an English Translation of the Office Action. (8 pages).

*Primary Examiner* — Saeid Ebrahimi Dehkord
(74) *Attorney, Agent, or Firm* — Buchanan Ingersoll & Rooney PC

(57) ABSTRACT

An image forming apparatus includes an image forming section configured to form an image on a sheet and a control section configured to control image formation at the image forming section and is connectable to a reading apparatus and a sheet processing apparatus. The control section includes a function to compare image data for image formation at the time of forming an image on the sheet at the image forming section with read-out image data produced from an image read out from the sheet at the reading apparatus; a function to detect an image abnormality from a comparison result; and a function to change a control state of an image forming action in accordance with sheet processing executed at the sheet processing apparatus at the time of having detected the image abnormality.

22 Claims, 16 Drawing Sheets

(56) References Cited

FOREIGN PATENT DOCUMENTS

| | | | |
|---|---|---|---|
| JP | 2007-50546 A | 3/2007 |
| JP | 2009-100320 A | 5/2009 |
| JP | 2010-42521 A | 2/2010 |

* cited by examiner

IMAGE FORMING APPARATUS, IMAGE FORMING SYSTEM, AND IMAGE FORMING APPARATUS CONTROL METHOD This application claims priority under 35 U.S.C. §119 to Japanese Patent Application No. 2013-79065 filed on Apr. 5, 2013, the entire disclosure of which is incorporated herein by reference in its entirety.

BACKGROUND OF THE INVENTION

1. Field of the Invention

The present invention relates to a technique to judge whether a sheet subjected to image formation is in a normal state and to perform control in image forming apparatuses, such as a copying apparatus, a printing apparatus, a facsimile apparatus, and a composite machine of these apparatuses.

2. Description of Related Art

In such an image forming apparatus, printing (image formation) is performed by steps of forming an image on a photoreceptor based on image data acquired by reading a document with a document reading device, transferring the image onto a sheet, and fixing the image onto the sheet.

Conventionally, there has been no measure to check whether images are output normally until the images are output by being transferred onto a sheet. Accordingly, in the case where a sheet is dirty, it is enough to output only one sheet of the dirty sheet as an abnormal image-formed sheet. However, in the case where abnormal images are caused by influences such as dirt (spilled toner, etc.) on a sheet conveyance passage, flaws on a photoreceptor drum and abnormalities in a transferring process, when images are printed on a plurality of sheets, abnormal image-formed sheets are output successively. Further, until an image is printed on a sheet, since the sheet is required to pass through multiple processes, there is a problem that it takes time and labor to detect a portion where abnormalities take place.

For this reason, conventionally, it has been proposed to enable an image forming apparatus to avoid occurrence of abnormalities by detecting transfer unevenness beforehand.

Further, it has been proposed to enable the evaluation of reproducibility with a technique to output information on a difference in image quality onto an operation panel by comparing image data input for image formation with read-out image data acquired by reading an image formed on a sheet.

In addition, with reference to such an image forming apparatus, various kinds of devices have been proposed by each of JPA (Japanese Unexamined Patent Publication No.) 2010-42521 and JPA 2005-331669.

In concrete terms, the above JPA 2010-42521 has proposed to stop a job in the case where image abnormalities continue due to read-out image data. However, although there is a description about control to stop a job, there is no indication of a conception that a job is continued in the case where image abnormalities cause no influence.

Further, the above JPA 2005-331669 has proposed to stop a job if image abnormalities are detected based on read-out image data. However, there is no indication of a conception that a job is continued in accordance with the state of image abnormalities.

Namely, in the above patent documents, if image abnormalities are detected, the execution of image formation is made to stop. Incidentally, in an image forming system in which an image forming apparatus and a sheet processing apparatus are combined, image abnormalities may occur on a region which is finally cut off. However, according to the propositions made hitherto, if image abnormalities occur, image formation is controlled to stop without exception.

Accordingly, even if the situation of a final output matter is no problem, since an image forming apparatus is stopped due to image abnormalities, useless image formation is repeated. With this, useless down time occurs. Further, since image formation is redone, sheets and time are wasted for such image formation, which causes the lowering of productivity.

The present invention has been achieved in view of the above problems, and an object of the invention is to control image formation by detecting image abnormalities appropriately in accordance with the state of an output matter (output sheet, printed matter) at the time of having detected image abnormalities on a sheet by comparing image data used for image formation with image data acquired by reading an image from the sheet.

SUMMARY OF THE INVENTION (1) An image forming apparatus which reflects one aspect of the present invention includes:
an image forming section configured to form an image on a sheet; and
a control section configured to control image formation at the image forming section;
wherein the image forming apparatus is constituted to be connectable to a reading apparatus to read out an image formed on the sheet by the image forming section and a sheet processing apparatus to apply various kinds of sheet processing to the sheet on which an image is formed at the image forming section; and
wherein the control section includes:
a function to compare image data for image formation at the time of forming an image on the sheet at the image forming section with read-out image data produced from an image read out from the sheet at the reading apparatus;
a function to detect an image abnormality from a comparison result; and
a function to change a control state of an image forming action in accordance with sheet processing executed at the sheet processing apparatus when an image abnormality has been detected.

(2) In the above (1), it is preferable that when the detected abnormality does not appear on the sheet after having executed the sheet processing, the control section continues the image forming action.

(3) In the above (1), it is preferable that the image forming apparatus further includes a notifying section to perform various kinds of notices, and when the detected abnormality does not appear on the sheet after having executed the sheet processing, the control section notifies the abnormality via the notifying section and then continues the image forming action.

(4) In the above (1), it is preferable that the image forming apparatus further includes a notifying section to perform various kinds of notices, and when the detected abnormality does not appear on the sheet after having executed the sheet processing, the control section notifies the abnormality via the notifying section and then continues the image forming action, and the control section stops the image forming action after the image forming action has been completed.

(5) In the above (1) to (4), it is preferable that when the detected abnormality appears on the sheet after having executed the sheet processing, the control section stops the image forming action.

(6) In the above (1) to (4), it is preferable that in the case where a series of image formation is handled as a job, when the detected abnormality appears on the sheet after having executed the sheet processing in a currently-executed job, and when the detected abnormality does not appear on the sheet after having executed the sheet processing in a subsequent job, the control section suspends the currently-executed job and makes the image forming action of the subsequent job executed preferentially.

(7) In the above (2) to (4), it is preferable that when the detected abnormality does not appear on the sheet after having executed the sheet processing, the control section controls based on an instruction of a user whether to continue the image forming action.

(8) In the above (1) to (7), it is preferable that in the case where the image forming apparatus is connected to be able to communicate with another image forming apparatus capable of executing an image forming action and sheet processing and a series of image formation is handled as a job, the control section transfers a job in which an abnormality has been detected during execution to the another image forming apparatus.

(9) In the above (8), it is preferable that for the job in which an abnormality has been detected during execution, the control section transfers recovery information indicating a position at which the job has been suspended due to the abnormality together with the job to the another image forming apparatus.

(10) In the above (1) to (9), it is preferable that the control section changes in accordance with the sheet processing a region for which a process of detecting an abnormality is performed.

(11) In the above (1) to (10), it is preferable that the reading apparatus is included in the image forming apparatus.

DETAILED DESCRIPTION OF THE PREFERRED EMBODIMENT

In the following paragraphs, one or more embodiments of the invention will be described by way of example and not limitation. It should be understood based on this disclosure that various other modifications can be made by those in the art based on these illustrated embodiments.

[Entire Constitution]

Hereafter, description will be given in detail to embodiments for implementing the present invention with reference to drawings. First, with reference to FIG. 1 and FIG. 2, description is given the constitution of each of an image forming apparatus and an image forming system according to the present embodiment.

Figure 1:
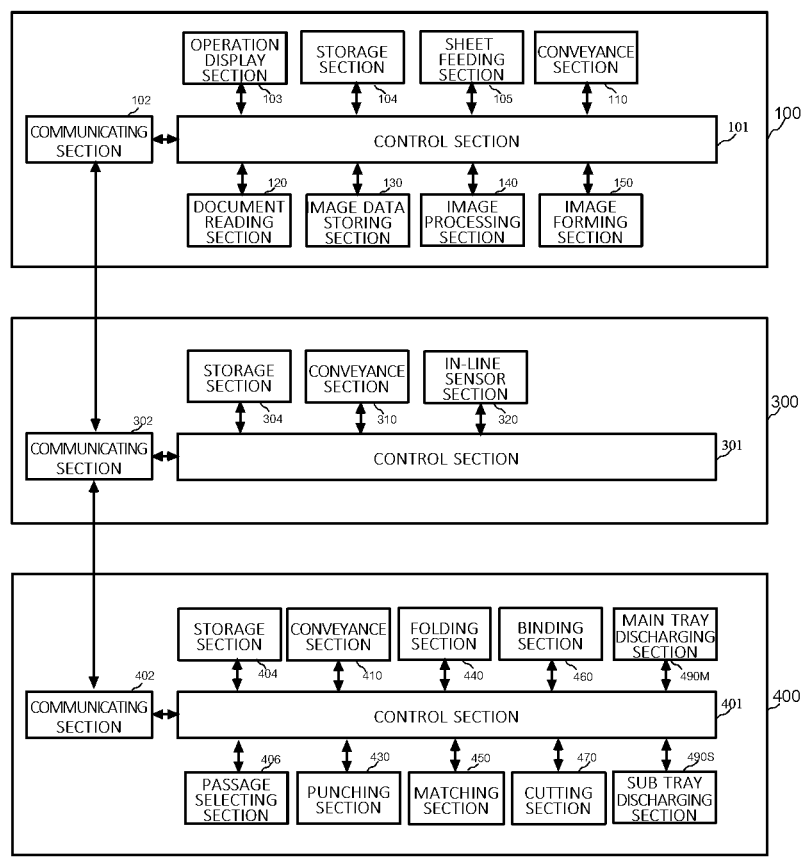
FIG. 1 is a block diagram showing a constitution of an image forming system of an embodiment of the present invention.
Figure 2:
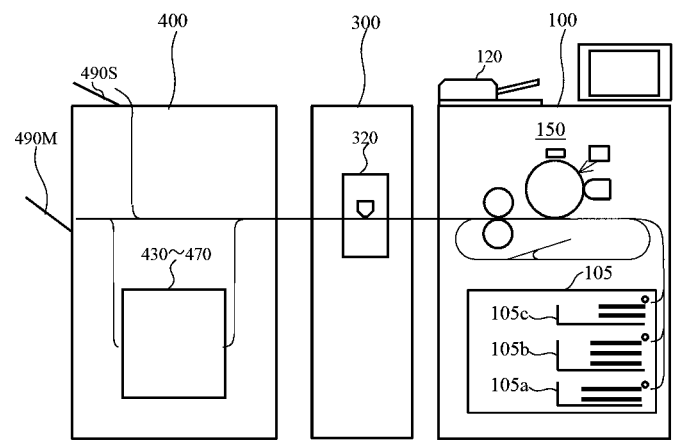
FIG. 2 is a constitution diagram showing a constitution of the image forming system of the embodiment of the present invention.

As shown in FIG. 1 and FIG. 2, the image forming system includes an image forming apparatus 100, a reading device 300 having a function to read out an image on a sheet being conveyed with a line sensor, and a sheet processing apparatus 400 provided with a sheet processing function and a sheet discharging function which are the post processing of image forming processing.

Hereafter, with reference to FIG. 1, description is given to the internal constitution of each of the image forming apparatus and the image forming system. Here, the internal constitution of the image forming system shown in FIG. 2 is shown in FIG. 1.

The image forming apparatus 100 includes a control section 101, a communicating section 102, an operation display section 103, a storage section 104, a sheet feeding section 105, a conveyance section 110, a document reading section 120, an image data storing section 130, an image processing section 140, and an image forming section 150.

The control section 101 is configured to control each section in the image forming apparatus 100 and to control the whole system as a sheet processing apparatus. The communicating section 102 is configured to communicate with other apparatuses connected. The operation display section 103 is configured to notify an operation input signal corresponding to operational input by an operator to the control section 101 and to perform indication of the state of the image forming apparatus 100, annunciation, and caution. The storage section 104 is configured to store control programs and various setting data and is used as a work area of each of the control programs. The sheet feeding section 105 is configured to feed sheets accommodated. The conveyance section 110 is configured to convey at a predetermined speed a sheet which is fed and subjected to image formation. The document reading section 120 is configured to scan a document so as to produce image data. The image data storing section 130 is configured to store image data and various data at the time of image formation. The image processing section 140 is configured to perform various kinds of image processing necessary for image formation. The image forming section 150 is configured to perform printing (hereafter, referred to as "image formation") by image creating, transferring, and fixing based on an image formation instruction and image data after image processing. Here, a sheet on which an image is formed at the image forming apparatus 100 is conveyed out toward an apparatus positioned at a latter stage.

The reading device 300 is disposed at a position after the image forming apparatus 100. This reading device 300 includes a control section 301, a communicating section 302, a storage section 304, a conveyance section 310, and an in-line sensor section 320. Here, the control section 301 is configured to control each section in the reading device 300. The communicating section 302 is configured to communicate with the image forming apparatus 100. The storage section 304 is configured to store control programs and various setting data and is used as a work area of each of the control programs. The conveyance section 310 is configured to convey a sheet at a predetermined speed. The in-line sensor section 320 is configured to read images, configuration, and colors on each of a sheet being conveyed and an inserted sheet with a line sensor. In this connection, a sheet conveyed into the inside of the reading device 300 is conveyed out towards an apparatus positioned at a latter stage. Further, the reading device 300 may be constituted so as to read out both surfaces of a sheet collectively with the in-line sensor section 320 or to read images one side by one side of a sheet by use of a reversing section.

The sheet processing apparatus 400 is also called a post processing apparatus, and is connected to the latter stage of the image forming apparatus 100 and the reading device 300. This sheet processing apparatus 400 includes a control section 401, a communicating section 402, a storage section 404, a passage selecting section 406, a conveyance section 410, a punching section 430, a folding section 440, a matching section 450, a binding portion 460, a cutting section 470, a sub tray discharging section 490S, and a main tray discharging section 490M. The control section 401 is configured to control each section in the sheet processing apparatus 400. The communicating section 402 is configured to communicate with the image forming apparatus 100 and the reading device 300. The storage section 404 is configured to store control programs and various setting data and is used as a work area of each of the control programs. The passage selecting section 406 is configured to select a conveyance passage and a sheet discharging passage for a sheet. The conveyance section 410 is configured to convey a sheet at a predetermined speed. The punching section 430 is configured to punch a sheet. The folding section 440 is configured to fold a sheet into a center fold or a threefold. The matching section 450 is configured to match a plurality of folded sheets. The binding portion 460 is configured to bind a bundle of folded and matched sheets. The cutting section 470 is configured to cut out end portions (small edge portions) of a sheet. The sub tray discharging section 490S is configured to discharge sheets into a sub tray as a discharging destination. The main tray discharge section 490M is configured to discharge sheets into a main tray as a discharging destination. The discharging tray should not be restricted to the main tray and the sub tray, and may include three or more rays.

Figure 3:
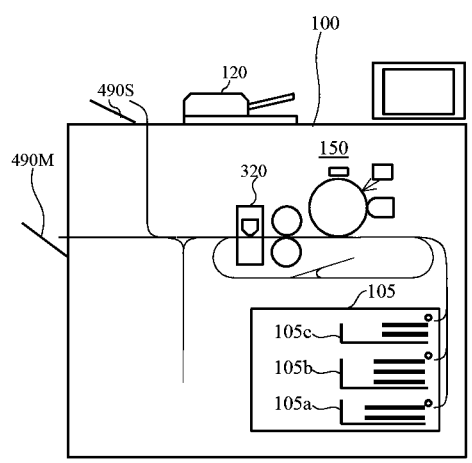
FIG. 3 is a constitution diagram showing a constitution of the image forming system of the embodiment of the present invention.

The above-mentioned function and constitution (refer to FIG. 1 and FIG. 2) of each of the image forming apparatus 100, the reading device 300, and the sheet processing apparatus 400 are merely one example and should not be limited to the example. That is, any of the image forming apparatus 100, the reading device 300, and the sheet processing apparatus 400 may be incorporated in or separated from a single unit such that the image forming system may be configured into an arbitrary constitution. For example, as shown in FIG. 3, the image forming apparatus 100 may be also constituted so as to include the reading device 300 (in-line sensor section 320) to read images on a sheet and the discharging sections 490S and 490M.

[Relationship Between Sheet Processing and Image Abnormalities]

Hereafter, description will be given briefly to an example of each of the relationship between a sheet handled in this embodiment and image abnormalities, a region on which image abnormalities appear, and a region on which image abnormalities do not appear.

Figure 4:
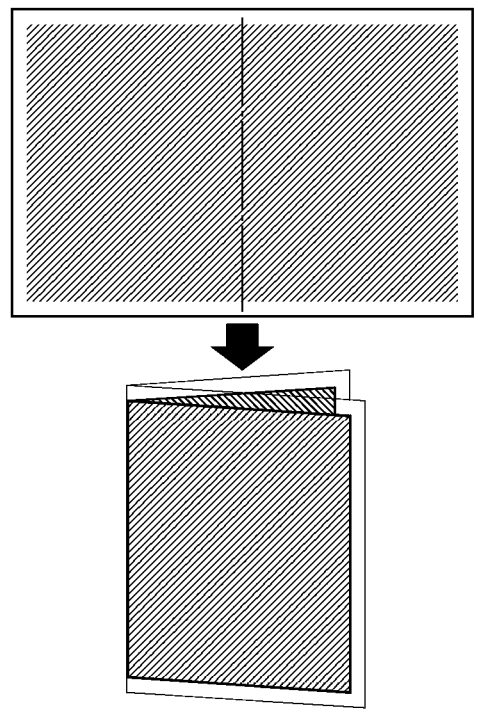
FIG. 4 is an explanatory diagram showing a state of a sheet used by the embodiment of the present invention.

FIG. 4 shows a sheet used for image formation. Here, a peripheral region not applied with hatching is a region (a cut-off elimination-scheduled region) scheduled to be eliminated by cutting off at the cutting section 470. On the other hand, a region applied with hatching is a region to be left by cutting at the cutting section 470.

Here, in the sheet processing at the sheet processing apparatus 400, a sheet as shown in FIG. 4 is made to a center fold at a portion indicated with a chain one-dashed line at the folding section 440. Thereafter, a top portion, a bottom portion, and small edge portions are eliminated and thrown away by booking processing. The order of the sheet processing is made such that any one of the center fold and the cutting may be executed earlier than the other one depending on the constitution of the sheet processing apparatus 400.

Figure 5:
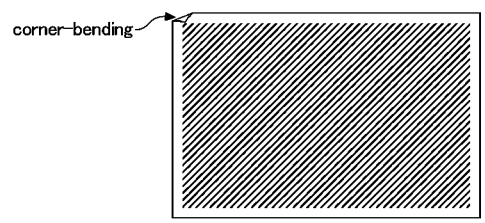
FIG. 5 is an explanatory diagram showing a state of a sheet used by the embodiment of the present invention.
Figure 6:
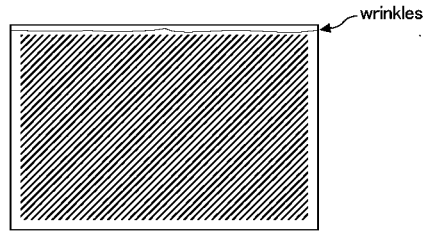
FIG. 6 is an explanatory diagram showing a state of a sheet used by the embodiment of the present invention.
Figure 7:
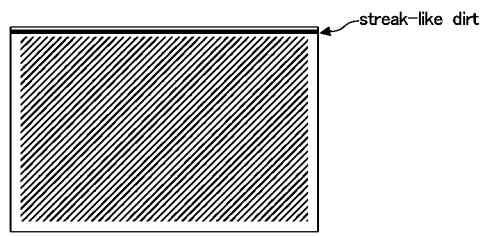
FIG. 7 is an explanatory diagram showing a state of a sheet used by the embodiment of the present invention.

Each of FIG. 5 to FIG. 7 shows an example of abnormalities taking place on a cut-off elimination-scheduled region of a sheet. In FIG. 5, "corner-bending" of a sheet takes place on a cut-off elimination-scheduled region of the sheet. In FIG. 6, "wrinkles" take place on a cut-off elimination-scheduled region of a sheet. In FIG. 7, "streak-like dirt" takes place on a cut-off elimination-scheduled region of a sheet.

In the above FIGS. 5 to 7, each of the corner-bending, the wrinkles, and the streak-like dirt takes place on a cut-off elimination-scheduled region of a sheet. Accordingly, on finally-output sheets (output matters), each of the corner bending, the wrinkles, and the streak-like dirt does not appear. Contrary, although been not shown in the drawings, if wrinkles and dirt exist on a region which is left even if a sheet is cut out, wrinkles and dirt appear on an output matter.

Figure 8:
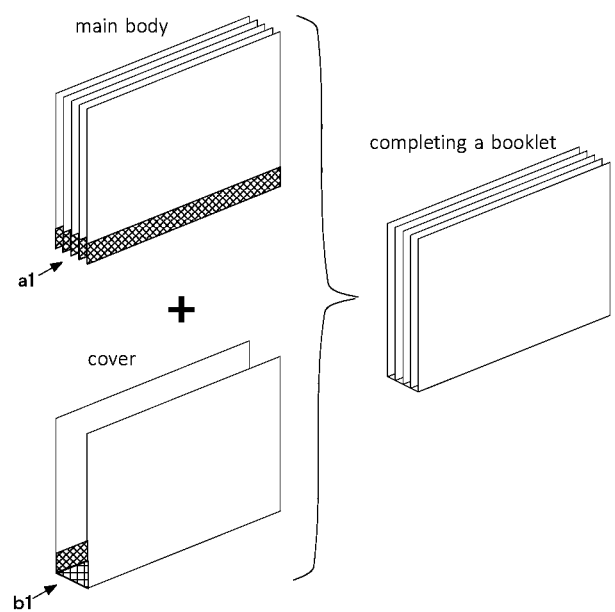
FIG. 8 is an explanatory diagram showing a state of a sheet used by the embodiment of the present invention.

FIG. 8 shows situations that a booklet is produced by wrap-bookbinding. As shown in FIG. 8, a portion of a book main body and a cover of a booklet are combined, pasted with an adhesive, and subjected to wrap-binding such that the book main body is wrapped with the cover, thereby completing a booklet. In this case of the wrap-binding, portions (a1 in FIG. 8) indicated with crosshatching in the portion of the book main body and portions (b1 in FIG. 8) indicated with crosshatching in the portion of the cover are positioned near to a portion fixed with the pasted adhesive. Accordingly, the portions indicated with crosshatching are not likely to appear as an outer appearance. Therefore, it becomes possible to handle the portions indicated with crosshatching as a region "which does not appear on an output matter".

Figure 9:
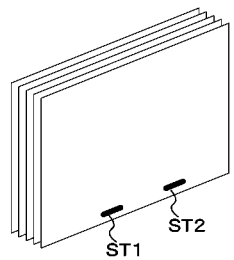
FIG. 9 is an explanatory diagram showing a state of a sheet used by the embodiment of the present invention.
Figure 10:
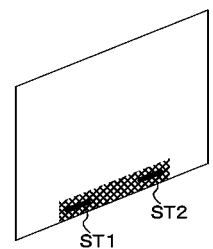
FIG. 10 is an explanatory diagram showing a state of a sheet used by the embodiment of the present invention.

FIG. 9 shows the appearance of a booklet by side-stitch bookbinding with two stapled positions. FIG. 10 shows the main body portion of the booklet produced by the side-stitch bookbinding shown in FIG. 9. A region indicated with crosshatching in the main body portion is positioned near to staple needles ST1 and ST2 each of which is a fixing member. That is, even if image abnormalities take place on the crosshatched region, the image abnormalities are not likely to appear. Accordingly, it becomes possible to handle the crosshatched region as a region which does not appear on an output matter.

Figure 11:
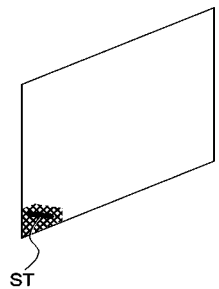
FIG. 11 is an explanatory diagram showing a state of a sheet used by the embodiment of the present invention.

Similarly, in the case of staple processing with one stapled position, the main body portion of a booklet is processed as shown in FIG. 11. Accordingly, a region which is indicated with crosshatching and positioned near to a staple needle ST being a fixing member is also a region on which image abnormalities if taking place are not likely to appear. Accordingly, it becomes possible to handle the crosshatched region as a region which does not appear on an output matter.

Figure 12:
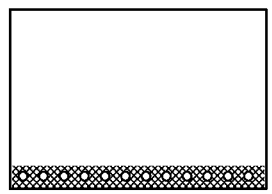
FIG. 12 is an explanatory diagram showing a state of a sheet used by the embodiment of the present invention.
Figure 13:
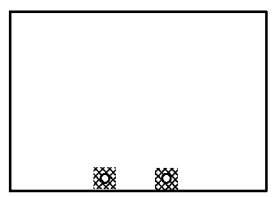
FIG. 13 is an explanatory diagram showing a state of a sheet used by the embodiment of the present invention.
Figure 14:
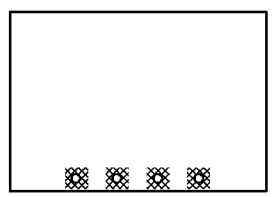
FIG. 14 is an explanatory diagram showing a state of a sheet used by the embodiment of the present invention.

FIG. 12 shows the appearance of a sheet which is subjected to punch processing for a ring binder with twelve holes. Here, a portion indicated with a circle represents a punch hole. Further, in a region indicated with crosshatching, a periphery of each of punch holes is continued serially to a periphery of a neighboring punch hole. Accordingly, even if image abnormalities take place on the crosshatched region, the image abnormalities on the crosshatched region are not likely to appear. FIG. 13 shows the appearance of a sheet which is subjected to punch processing for a ring binder with two holes. FIG. 14 shows the appearance of a sheet which is subjected to punch processing for a ring binder with four holes. In each of FIG. 13 and FIG. 14, even if image abnormalities take place on the crosshatched region on the periphery of each of punch holes, the image abnormalities on the crosshatched region are not likely to appear. Accordingly, it becomes possible to handle such a crosshatched region as a region which does not appear on an output matter.

With above manners, a region on which image abnormalities do not appear on an output matter and a region on which image abnormalities are not likely to appear on an output matter are excluded from abnormality detection regions and handled as an abnormality detection-excluded region. In other words, a region of a sheet from which abnormality detection-excluded regions are eliminated may be determined finally as an abnormality detection region.

Figure 15:
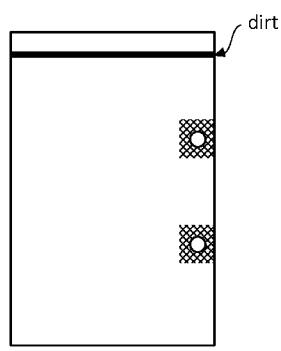
FIG. 15 is an explanatory diagram showing a state of a sheet used by the embodiment of the present invention.
Figure 16:
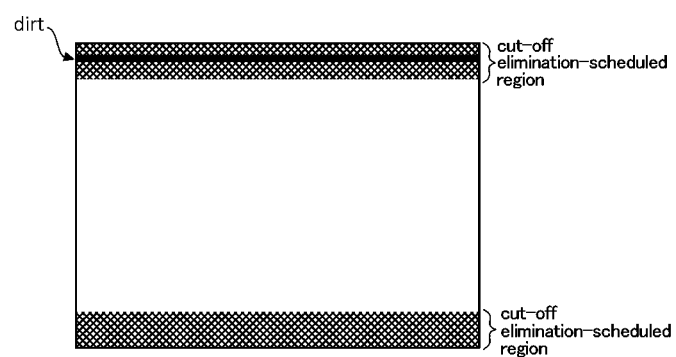
FIG. 16 is an explanatory diagram showing a state of a sheet used by the embodiment of the present invention.

In FIG. 15, on a sheet having subjected to punch processing with two holes as a first job, streak-like dirt takes place on a region which appears on an output matter. Such streak-like dirt is caused by dirt on a roller in each section in the image forming apparatus 100 and the sheet processing apparatus 200. In this case, in a second job, as shown in FIG. 16, a region on which streak-like dirt takes place is included in a cut-off elimination-scheduled region. With this, in the second job, the streak-like dirt is made not to appear on an output matter even if a maintenance work is not performed for the image forming apparatus 100.

Incidentally, a region on which abnormalities do not appear on an output matter may become different depending on the situation of each of bookbinding, stitching, and fixing, the number of pages, the thickness of a sheet, and the like. Accordingly, it is preferable that the control section 101 determines such a region based on parameters prepared beforehand. Further, it is also preferable to adjust such a region by a user.

[Action (1) in an Embodiment]

Hereafter, description will be given to an action (1) in an image forming apparatus and an image forming system and to a processing procedure (1) in an image forming apparatus control method in this embodiment. Here, the description is given in accordance with operation procedures with reference to flowcharts shown in FIG. 17 and the following figures. Further, as a specific example in this embodiment, the description is given to a case where the in-line sensor section 320 is arranged at the reading device 300. Furthermore, this action (1) is characterized by performing setting of an abnormality detection region in advance of abnormality detection.

Figure 17:
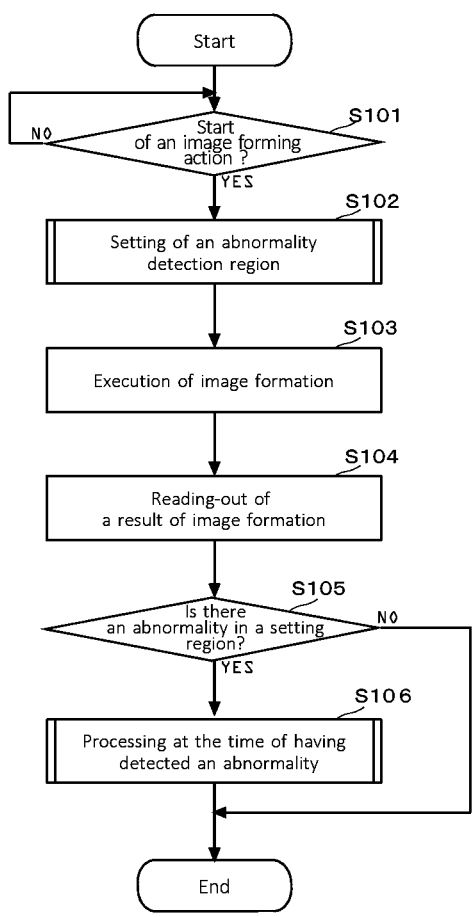
FIG. 17 is a flowchart showing the action of image formation of the embodiment of the present invention.

When start of image formation is instructed from the operation display section 103 or an external device (YES at Step S101 in FIG. 17), the control section 101 sets up an abnormality detection region (Step S102 in FIG. 17). Here, the setting of an abnormality detection region (Step S102 in FIG. 17) is described with reference to a flowchart shown in FIG. 18.

Figure 18:
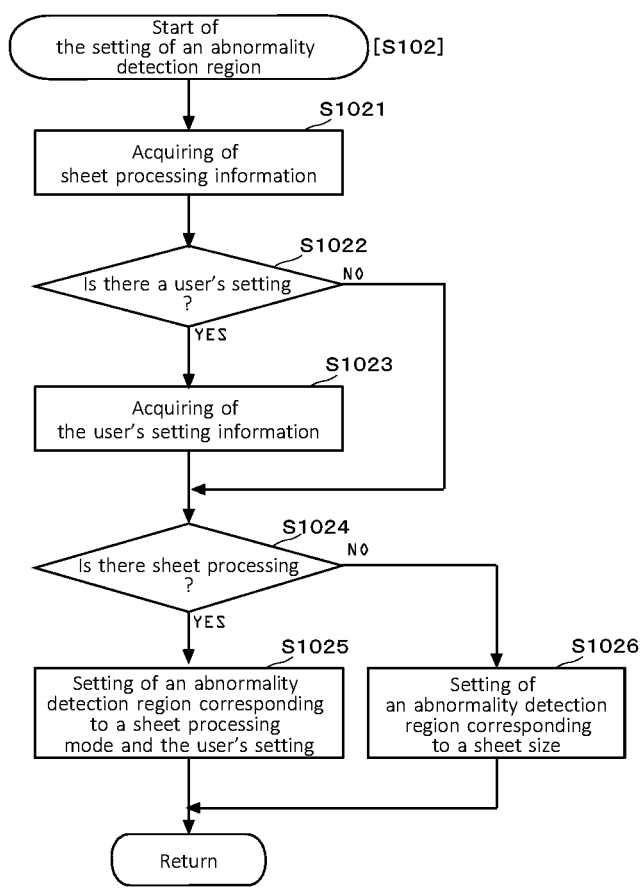
FIG. 18 is a flowchart showing the action of image formation of the embodiment of the present invention.

First, with reference to the image formation to be executed, the control section 101 acquires the information on what kind of sheet processing to be performed at the sheet processing apparatus 400 after an image has been formed at the image forming apparatus 100 (Step S1021 in FIG. 18). Here, as the information on what kind of sheet processing to be performed, for example, information on a sheet processing mode corresponds to it.

In this case, examples of the information on a sheet processing mode includes a type of sheet processing (folding, stapling, punching, cutting, bookbinding, etc.) and a position of sheet processing (a folding position in the case of folding, the number of staples and stapling positions in the case of stapling, the number of punches and punching positions in the case of punching, a cutting position and an amount of cutting in the case of cutting, and a pasting position in the case of bookbinding).

Figure 19:
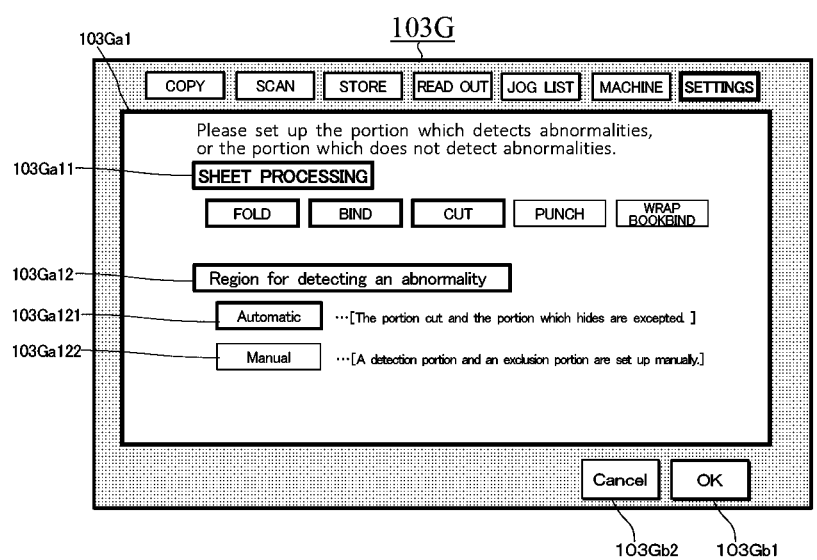
FIG. 19 is an explanatory diagram showing an example of a screen at the time of acting of an image forming system of the embodiment of the present invention.

Further, with reference to the image formation to be executed, the control section 101 checks whether an abnormality detection region has been set up by a user (Step S1022 in FIG. 18). FIG. 19 shows an abnormality detection region setting screen 103Ga1 displayed on an operation screen 103G which the control section 101 indicates on the operation display section 103. In FIG. 19, the content of sheet processing in the image formation to be executed is shown (103Ga11 in FIG. 19), and in the content of sheet processing, center fold, saddle stitch, and cutting off are indicated as being designated.

Further, in the item of abnormality detection region (103Ga12 in FIG. 19), when the tab of automatic setting (103Ga121 in FIG. 19) is selected, abnormality detection regions are automatically set up so as to exclude cut-off elimination-scheduled regions and regions which locate in the vicinity of fixing members and are not likely to appear. On the other hand, in the item of abnormality detection region, when the tab of manual setting (103Ga122 in FIG. 19) is selected, it becomes possible to set up manually abnormality detection regions. That is, in addition to the automatically-set abnormality detection regions, it becomes possible to increase or decrease cut-off elimination-scheduled regions and regions which locate in the vicinity of fixing members and are not likely to appear and to set newly abnormality detection regions by the manual setting on another screen (not shown). Here, FIG. 19 currently shows an example of screens where automatic setting (103Ga121 in FIG. 19) is selected and manual setting (103Ga122 in FIG. 19) is not selected in the item of abnormality detection region (103Ga12 in FIG. 19).

That is, if the manual setting by a user has been made with regard to abnormality detection regions (YES at Step S1022 in FIG. 18), the control section 101 acquires the user setting information (Step S1023 in FIG. 18).

Successively, when executing the sheet processing with reference to the image formation to be executed (YES at Step S1024 in FIG. 18), the control section 101 refers both the information on the sheet processing mode acquired at Step S1021 and the user setting information acquired at Step S1023 when the user setting exists, and sets up abnormality detection regions in the state that abnormality detection-excluded regions are excluded in accordance with the two pieces of the information (Step S1025 in FIG. 18).

On the other hand, when not executing the sheet processing with reference to the image formation to be executed (NO at Step S1024 in FIG. 18), the control section 101 sets up abnormality detection regions based on the size of a sheet used for image formation (Step S1025 in FIG. 18). Subsequently, after completing the processing in the subroutine (Steps S1021 to S1026 in FIG. 18) with regard to the abnormality detection region setting in FIG. 17 (Step S102 in FIG. 17), the control section 101 returns to the processing in the main routine shown in FIG. 17.

Here, after applying necessary image processing to image data at the image processing section 140, the control section 101 forms a toner image on an image bearing member at the image forming section 150 by using the image data and transfers and fixes the toner image on a sheet (Step S103 in FIG. 17).

In this way, the sheet on which the toner image is formed is conveyed from the image forming apparatus 100 toward the in-line sensor section 320 of the reading device 300 (refer to FIG. 2 and FIG. 3).

Subsequently, when the sheet is conveyed toward the reading device 300, the in-line sensor section 320 reads out the image on the sheet in accordance with control of the control section 301 upon receipt of an instruction from the control section 101 (Step S104 in FIG. 17).

The readout image data which are the result of the reading-out for the sheet by the in-line sensor section 320 are transmitted to the control section 101 via the control section 301, the communication section 302, and the communication section 102.

The control section 101 compares the read-out image data transmitted from the in-line sensor section 320 with the image formation image data used for forming the image on the sheet corresponding to the read-out image data, and detects image abnormalities from the comparison result (Step S105 in FIG. 17).

In this embodiment, an object of the detection of image abnormalities by the comparison between the read-out image data and the image formation image data is to detect abnormalities in the above-mentioned abnormality detection regions, such as corner bending, wrinkles, and dirt, which lower the grade of output matters.

Thereafter, if image abnormalities are detected in the abnormality detection regions (YES at Step S105 in FIG. 17), the control section 101 executes predetermined processing at the time of having detected abnormalities (when an image abnormality has been detected) (Step S106 in FIG. 17).

On the other hand, if no image abnormality is detected in the abnormality detection regions (NO at Step S105 in FIG. 17), the control section 101 ends the processing in the action (1) (END in FIG. 17).

Incidentally, the case where no image abnormality is detected in the abnormality detection regions (NO at Step S105 in FIG. 17) includes not only a case where an image abnormality does not occur at all, but also includes a case where, although image abnormalities occur in the abnormality detection-excluded regions (refer to FIG. 4 to FIG. 14), the image abnormalities do not appear actually, which allows to continue the job. In the latter case, although image abnormalities occur, the job is not stopped. That is, for abnormalities taking place in regions cut off by cutting and abnormalities taking place in regions where the abnormalities are not likely to appear by being disappeared with punches, staples, or wrap-bookbinding, the image forming action is continued without being stopped. With this, it becomes possible to control image formation by detecting image abnormalities appropriately in accordance with the state of the output matters by the sheet processing.

Therefore, in the case where image abnormalities in the state that they do not cause problems on a final output matter, are detected, the image forming action is controlled so as not to stop, whereby it becomes possible to prevent useless down time and the slowdown of productivity.

In the case where image abnormalities occur on the abnormality detection-excluded regions, the image abnormalities is made disappear with regions cut off by cutting, punches, staples, wrap-bookbinding, or the like. For this reason, it is preferable to announce the fact that abnormalities occur on the disappeared region, in such a way of an alarm indication or an attention awakening announcement on the operation display section 103 by control of the control section 101. Further, in the case where image abnormalities occur in the abnormality detection-excluded regions, the image abnormalities is made disappear with regions cut off by cutting, punches, staples, wrap-bookbinding, and or like. For this reason, it is preferable to announce the fact that abnormalities occur on the disappeared region, in such a way of an alarm indication or an attention awakening announcement on the operation display section 103, and upon receipt of acknowledgement from a user, the control section 101 may perform control to continue the job. In this case, it becomes possible to continue the image forming action without stopping while awakening a user's attention. Further, it becomes possible to control image formation by detecting image abnormalities appropriately in accordance with the state of output matters by sheet processing. Furthermore, by stopping the image forming action after the image forming action has completed, it also becomes possible to keep the condition of the image forming apparatus appropriate.

Figure 20:
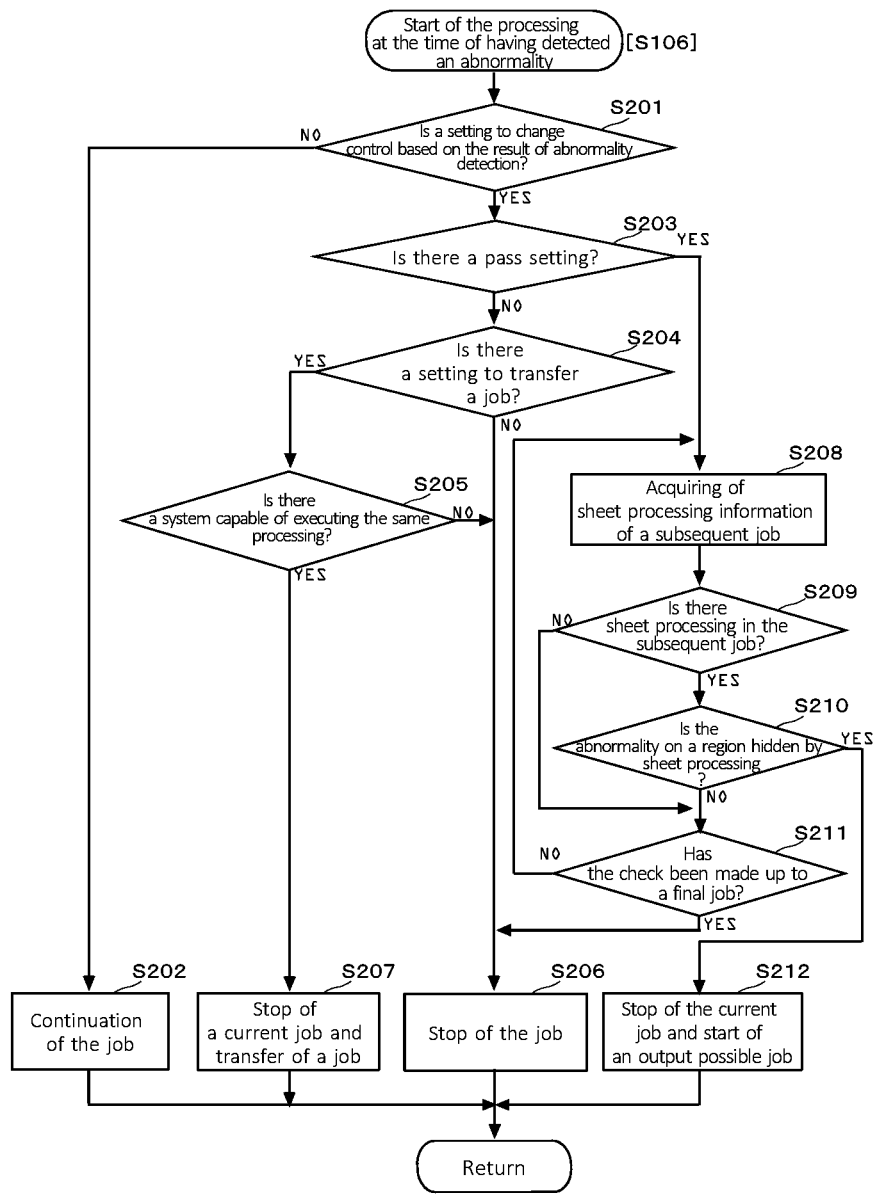
FIG. 20 is a flowchart showing the action of image formation of the embodiment of the present invention.

Now, description is given to the processing at the time of having detected abnormalities (Step S106 in FIG. 17) based on a flowchart shown in FIG. 20. First, the control section 101 checks whether a setting as the processing at the time of having detected abnormalities is made to change the control state of each of the image forming action and the sheet processing action based on the abnormality detection result (Step S201 in FIG. 20).

Here, the setting to change a control state means switching among multiple control states in a currently-executed job.

For example, it may be permissible to switch only two states of "continuation of the job" and "stop of the job". However, in this embodiment, a specific example is directed to a case where the control state of a currently-executed job is selectively changed to any one of four states, such as "continuation of the job", "stop of the job", "stop of the current job and transfer of the job to another apparatus" and "stop of the current job and start of an output-possible subsequent job".

Here, in the case where a setting is not made to change the control state of each of the image forming action and the sheet processing action based on the abnormality detection result (NO at Step S201 in FIG. 20), the control section 101 controls to continue the action of the job without performing a special control as the processing at the time of having detected abnormalities (Step S202 in FIG. 20).

On the other hand, in the case where a setting is made to change the control state of each of the image forming action and the sheet processing action based on the abnormality detection result (YES at Step S201 in FIG. 20), the control section 101 checks whether a pass setting is set up (Step S203 in FIG. 20).

Here, description is given to the pass setting. As shown in FIG. 15, it is assumed that streak-like dirt occurs in an abnormality detection region in a currently-executed first job. Accordingly, the first job is in a situation that the execution should be stopped. On the other hand, as shown in FIG. 16, in a second job, streak-like dirt occurs on a cut-out elimination-scheduled region at the outside of abnormality detection regions. Accordingly, the second job is in a state that execution is possible. For this reasons, the control state is set to "stop of the current job and start of an output-possible subsequent job", whereby the subsequent job is controlled to the state of having passed (overtaken) a currently-executed job. Such control means the pass setting. Further, such control means that the pass setting is not applied only to a job right after a currently-executed job, but also to any executable job of subsequent jobs such that the executable job is executed preferentially by passing the currently-executed job.

Here, when the pass setting is not set up (NO at Step S203 in FIG. 20), the control section 101 checks whether a job transfer setting (a setting to transfer a job) is set up (Step S204 in FIG. 20). The job transfer setting is set up in the following ways. In the case where there exists an image forming system capable of executing the same processing with the image forming apparatus 100 and the sheet processing apparatus 400 in which a job is currently executed, the job in the state of being not able to continue the execution due to the detection of image abnormalities is transferred to the image forming system, and then the job is completed at the image forming system side to where the job has been transferred.

Here, when the job transfer setting is not set up (NO at Step S204 in FIG. 20), since a measure to continue the job by avoiding image abnormalities does not exist, the control section 101 controls to stop the execution of the job in the image forming apparatus 100 and the sheet processing apparatus 200 (Step S206 in FIG. 20).

On the other hand, when the job transfer setting is set up (YES at Step S204 in FIG. 20), the control section 101 checks whether the image forming system capable of executing the same processing necessary to execute the job transfer exists within a range in which the image forming apparatus 100 is connected via a network (Step S205 in FIG. 20).

Here, when the image forming system (hereafter, referred to as "transferable image forming system") capable of executing the same processing necessary to execute the job transfer does not exist within a range in which the image forming apparatus 100 is connected via a network (NO at Step S205 in FIG. 20), since a measure to continue the job by avoiding image abnormalities does not exist, the control section 101 controls to stop the execution of the job in the image forming apparatus 100 and the sheet processing apparatus 200 (Step S206 in FIG. 20).

On the other hand, when the image forming system capable of executing the same processing necessary to execute the job transfer exists within a range in which the image forming apparatus 100 is connected via a network (YES at Step S205 in FIG. 20), the control section 101 stops the execution of the job in the image forming apparatus 100 and the sheet processing apparatus 200, and transfers the job in the state of being not able to continue the execution due to the detection of image abnormalities to the transferable image forming system (step S207 in FIG. 20).

At this time, with regard to the job in which abnormalities were detected during execution, the control section 101 controls to transfer the information of the job to the transferable image forming system in the state of being attached with recovery information showing the position at which the processing is suspended due to the abnormalities. With this, at the transferable image forming system side, the processing after the suspended processing of the job in which abnormalities were detected can be continued in the condition that there is neither duplication nor omission.

Moreover, in the case where a setting is made to change the control state of each of the image forming action and the sheet processing action based on the result of abnormality detection (YES at Step S201 in FIG. 20), when the pass setting is set up (YES at Step S203 in FIG. 20), the control section 101 acquires the sheet processing information of a subsequent job (Step S208 in FIG. 20). In this case, the control section 101 acquires information, such as abnormality detection-excluded regions with regard to the sheet processing of the subsequent job.

Then, based on the acquired sheet processing information of the subsequent job, the control section 101 judges whether image abnormalities do not appear due to the application of the abnormality detection-excluded region (due to taking place on the abnormality detection-excluded region) (Step S209, S210 in FIG. 20).

Here, when image abnormalities are not applied with an abnormality detection-excluded region by the sheet processing of the subsequent job (NO at Step S210 in FIG. 20), the control section 101 searches subsequent jobs one by one up to a final job (Steps S208 to S211 in FIG. 20).

Even if the control section 101 has searched the subsequent jobs one by one up to the final job (Steps S208 to S211 in FIG. 20), when image abnormalities are not hidden due to non-application of an abnormality detection-excluded region (No at Step S210, and YES at Step S211 in FIG. 20), since there is no measure to continue the job by avoiding the image abnormalities, the control section 101 controls to stop the execution of the job in the image forming apparatus 100 and the sheet processing apparatus 200 (Step S206 in FIG. 20).

On the other hand, as a result of the searching of the subsequent jobs one by one (Steps S208 to S211 in FIG. 20), in the case where image abnormalities do not appear due to the application of an abnormality detection-excluded region in any one of the subsequent jobs (YES at Step S210 in FIG. 20), the job can be continued by avoiding the image abnormalities by the subsequent job as shown in FIG. 16. Accordingly, the control section 101 controls to stop the current job in the image forming apparatus 100 and the sheet processing apparatus 200, and controls to start the execution of the subsequent job which can be output without the appearing of an image abnormality (Step S212 in FIG. 20).

As mentioned above, in the case where the image forming apparatus 100 has a function to compare image data for image formation at the time of forming an image on a sheet with read-out image data produced at the in-line sensor section 320 by reading the sheet and to detect image abnormalities from the comparison result, when an image abnormality is detected, the control state of the image forming action is changed ("stop of the job", "continuation of the job", "stop of the current job and transfer of the job", and "stop of the current job and start of an output-possible job") in response to the sheet processing executed at the sheet processing apparatus 400, whereby it becomes possible to control image formation by detecting image abnormalities appropriately in accordance with the state of output matters by sheet processing such as cutting, punching, stapling, and wrap-bookbinding.

Therefore, in the case where image abnormalities in the state of being no problem as a final output matter are detected, by controlling not to stop an image forming action, it becomes possible to prevent useless down time and slowdown of productivity.

Further, in the case where detected image abnormalities do not appear on a sheet after having been subjected to sheet processing (after sheet processing has been executed for the sheet), by making the image forming action continue, the detected image abnormalities are made disappear with a region cut off by cutting, punches, staples, wrap-bookbinding, or the like. Accordingly, for abnormalities taking place on disappeared regions, since it is permitted not to stop the image forming action, it becomes possible to control image formation by detecting image abnormalities appropriately in accordance with the state of output matters by sheet processing.

Further, in the case where detected abnormalities exist on a sheet after having been subjected to sheet processing and appear on the sheet, by stopping the image forming action, it becomes possible to control image formation by detecting image abnormalities appropriately in accordance with the state of output matters by sheet processing.

Furthermore, by changing regions subjected to abnormality detection (a process of detecting abnormalities) in accordance with sheet processing, it becomes possible to exclude previously regions eliminated by cutting and the like from abnormality detection regions, whereby it becomes possible to control image formation rapidly by detecting image abnormalities appropriately on required regions in accordance with the state of output matters by sheet processing.

Moreover, in the case where detected image abnormalities remain and appear on a sheet after having been subjected to sheet processing in a currently-executed job, when image abnormalities do not appear on a sheet after having been subjected to sheet processing in a subsequent job, by suspending the currently-executed job and making the image forming action of the subsequent job executed preferentially, it becomes possible to continue the image forming action in accordance with the condition of the image forming apparatus without stopping. Accordingly, it becomes possible to control image formation by detecting image abnormalities appropriately in accordance with the state of output matters by sheet processing.

[Action (2) in an Embodiment]

Hereafter, description will be given to an action (2) in an image forming apparatus and an image forming system and to a processing procedure (2) in an image forming apparatus control method in this embodiment. Here, the description is given in accordance with operation procedures with reference to flowcharts shown in FIG. 21 and FIG. 22. Further, as a specific example in this embodiment, the description is given to a case where the in-line sensor section 320 is arranged at the reading device 300. Furthermore, different from the above-mentioned action (1), this action (2) is characterized by acquiring sheet processing information at the time of having detected abnormalities and judging whether to continue.

Figure 21:
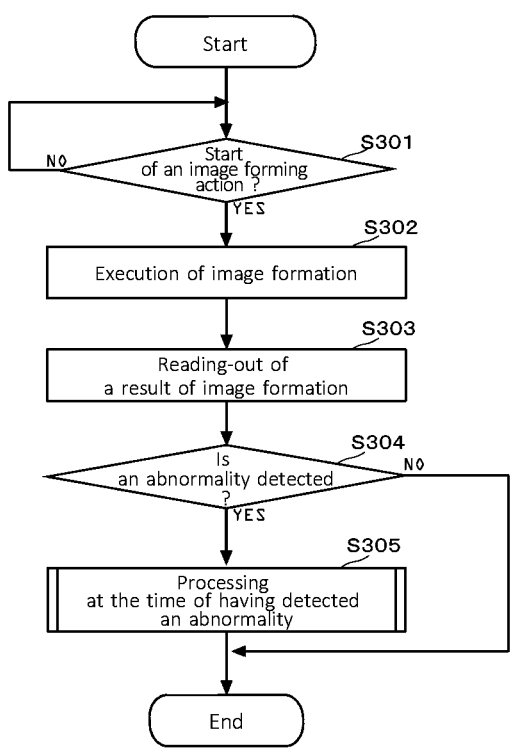
FIG. 21 is a flowchart showing the action of image formation of the embodiment of the present invention.

When start of image formation is instructed from the operation display section 103 or an external device (YES at Step S301 in FIG. 21), the control section 101 applies necessary image processing to image data at the image processing section 140, then forms a toner image on an image bearing member at the image forming section 150 by using the image data, and transfers and fixes the toner image on a sheet (Step S302 in FIG. 21).

In this way, the sheet on which the toner image is formed is conveyed from the image forming apparatus 100 toward the in-line sensor section 320 of the reading device 300 (refer to FIG. 2 and FIG. 3).

Subsequently, when the sheet is conveyed toward the reading device 300, the in-line sensor section 320 reads out the image on the sheet in accordance with control of the control section 301 upon receipt of an instruction from the control section 101 (Step S303 in FIG. 21).

The readout image data which are the result of the reading-out of the sheet by the in-line sensor section 320 are transmitted to the control section 101 via the control section 301, the communication section 302, and the communication section 102.

The control section 101 compares the readout image data read transmitted from the in-line sensor section 320 with the image formation image data used for forming an image on the sheet corresponding to the readout image data, and detects image abnormalities from the comparison result (Step S304 in FIG. 21).

In this action (2), an object of the detection of image abnormalities by the comparison between the readout image data and the image data for image formation is to detect abnormalities which lower the grade of output matters, such as corner bending, wrinkles, and dirt, on the whole region of a sheet without specifying an abnormality detection region.

Thereafter, if image abnormalities are detected in any portion of the whole region (YES at Step S304 in FIG. 21), the control section 101 executes predetermined processing at the time of having detected abnormalities (Step S305 in FIG. 21).

On the other hand, if no image abnormality is detected on the whole region of the sheet (NO at Step S304 in FIG. 21), the control section 101 ends the processing in the action (2) (END in FIG. 21). Here, the state that no image abnormality is detected on the region of the sheet (NO at Step S304 in FIG. 21) means the case where an image abnormality does not occur at all. Accordingly, the image forming action can be continued without being stopped.

Figure 22:
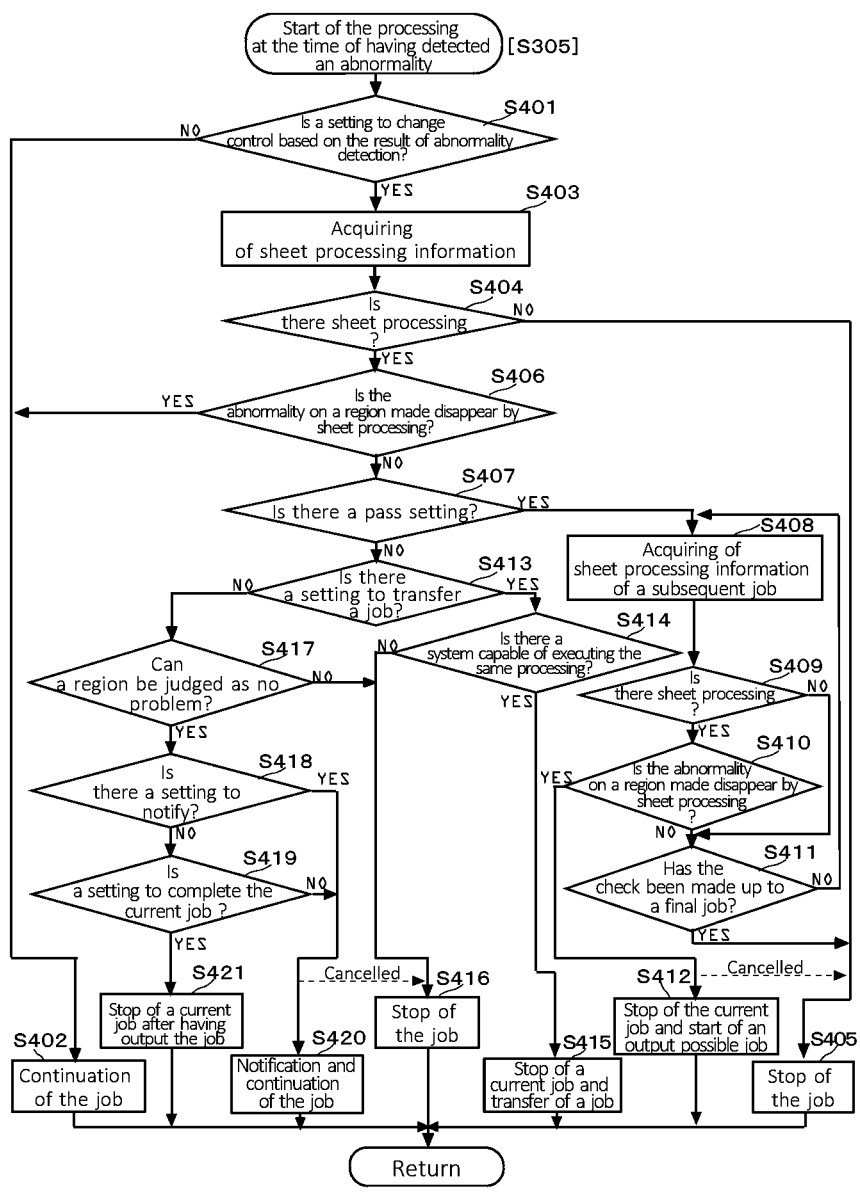
FIG. 22 is a flowchart showing the action of image formation of the embodiment of the present invention.

Now, description is given to processing at the time of having detected abnormalities (Step S305 in FIG. 21) based on a flowchart shown in FIG. 22. First, the control section 101 checks whether a setting as the processing at the time of having detected abnormalities is made to change the control state of each of the image forming action and the sheet processing action based on the abnormality detection result (Step S401 in FIG. 22). Here, the setting to change a control state means switching among multiple control states in a currently-executed job.

For example, it may be permissible to switch only two states of "continuation of the job" and "stop of the job". However, in this embodiment, a specific example is directed to a case where the control state of a currently-executed job is selectively changed to any one of six states, such as "continuation of the job", "stop of the job", "stop of the current job and transfer of the job to another apparatus" "stop of the current job and start of an output-possible subsequent job", "stop of the job after having output the job" and "notification and continuation of the job".

Here, in the case where a setting is not made to change the control state of each of the image forming action and the sheet processing action based on the abnormality detection result (NO at Step S401 in FIG. 22), the control section 101 controls to continue the action of a job without performing a special control as the processing at the time of having detected abnormalities (Step S402 in FIG. 22).

On the other hand, in the case where a setting is made to change the control state of each of the image forming action and the sheet processing action based on the abnormality detection result (YES at Step S201 in FIG. 20), the control section 101 acquires the sheet processing information of a currently-executed job (Step S403 in FIG. 22). In this case, the control section 101 acquires information on cut-off elimination-scheduled regions, regions hidden by bookbinding, and the like with regard to sheet processing.

Then, based on the acquired sheet processing information, the control section 101 judges whether image abnormalities do not exist by the application of regions on which image abnormalities are made not to exist by sheet processing such as being cut off at the cutting section 470 (Steps S404 and S406 in FIG. 22).

Here, by executing sheet processing (YES at Step S404 in FIG. 22), when image abnormalities are made not to exist by the sheet processing such as being cut off at the cutting section 470 (YES at Step S406 in FIG. 22), the control section 101 controls to continue the action of the job without performing a special control as processing at the time of having detected abnormalities (Step S402 in FIG. 22).

On the other hand, when sheet processing is not executed (NO at Step S404 in FIG. 22), image abnormalities do not disappear and the image abnormalities cannot be avoided. Accordingly, the control section 101 controls to stop the execution of the job in the image forming apparatus 100 and the sheet processing apparatus 200 (Step S405 in FIG. 22).

Further, although sheet processing is executed (YES at Step S404 in FIG. 22), when image abnormalities are not applied to the regions on which image abnormalities are made not to exist by sheet processing such as being cut off at the cutting section 470 (NO at Step S406 in FIG. 22), the control section 101 checks whether a pass setting is set up (Step S407 in FIG. 22). Here, the pass setting means that, for example, any job of subsequent jobs can be executed by passing (overtaking) the currently-executed job as shown in FIG. 15 and FIG. 16.

Here, when the pass setting is not set up (NO at Step S407 in FIG. 22), the control section 101 checks whether a job transfer setting is set up (Step S413 in FIG. 22).

The job transfer setting is set up in the following ways. In the case where there exists an image forming system capable of executing the same processing with the image forming apparatus 100 and the sheet processing apparatus 400 in which a job is currently executed, the job in the state of being not able to continue the execution due to the detection of image abnormalities is transferred to the image forming system, and then the job is completed at the image forming system side to where the job has been transferred.

Here, although the pass setting is not set up (NO at Step S407 in FIG. 22), when the job transfer setting is set up (YES at Step S413 in FIG. 22), the control section 101 checks whether the image forming system capable of executing the same processing necessary to execute the job transfer exists within a range in which the image forming apparatus 100 is connected via a network (Step S414 in FIG. 22).

Here, when the image forming system (transferable image forming system) capable of executing the same processing necessary to execute the job transfer exists within a range in which the image forming apparatus 100 is connected via a network (YES at Step S414 in FIG. 22), the control section 101 stops the job being executed in the image forming apparatus 100 and the sheet processing apparatus 200, and transfers the job in the state of being not able to continue the execution due to the detection of image abnormalities to the transferable image forming system (step S415 in FIG. 22). At this time, with regard to the job in which abnormalities were detected during execution, the control section 101 controls to transfer the information of the job to the transferable image forming system in the state of being attached with recovery information showing the position at which the processing is suspended due to the abnormalities. With this, at the transferable image forming system side, the processing after the suspended processing of the job in which abnormalities were detected can be continued in the condition that there is neither duplication nor omission.

On the other hand, when the image forming system (transferable image forming system) capable of executing the same processing necessary to execute the job transfer does not exist within a range in which the image forming apparatus 100 is connected via a network (NO at Step S414 in FIG. 22), this situation means that a measure to continue the job by avoiding image abnormalities does not exist. Accordingly, the control section 101 controls to stop the execution of the job in the image forming apparatus 100 and the sheet processing apparatus 200 (Step S416 in FIG. 22).

In the following setting conditions that a setting is made to change the control state of each of the image forming action and the sheet processing action based on the results of abnormality detection (YES at Step S401 in FIG. 22), that although sheet processing is executed (YES at Step S404 in FIG. 22), image abnormalities are not applied to regions on which image abnormalities are made not to exist by being cut off at the cutting section 470 (NO at Step S406 in FIG. 22), and that a pass setting is set up (YES at Step S407 in FIG. 22), the control section 101 acquires the sheet processing information of a subsequent job (Step S408 in FIG. 22). In this case, the control section 101 acquires information on cut-off elimination-scheduled regions, regions hidden by bookbinding, and the like with regard to sheet processing.

Then, based on the acquired sheet processing information of the subsequent job, the control section 101 judges whether image abnormalities do not exist by the application of regions which is cut off by the cutting section 380 (Steps S409 and S410 in FIG. 22).

Here, when image abnormalities are not applied to the regions on which the image abnormalities are made not to exist by the sheet processing of the subsequent job (NO at Step S410 in FIG. 22), the control section 101 searches subsequent jobs one by one up to a final job (Steps S408 to S411 in FIG. 22).

Even if the control section 101 has searched the subsequent jobs one by one up to the final job (Steps S408 to S411 in FIG. 22), when the image abnormalities are not applied to the regions on which the image abnormalities are made not to exist (No at Step S410, and YES at Step S411 in FIG. 22), since there is no measure to continue the job by avoiding the image abnormalities, the control section 101 controls to stop the execution of the job in the image forming apparatus 100 and the sheet processing apparatus 200 (Step S405 in FIG. 22).

On the other hand, as a result of the searching of the subsequent jobs one by one (Steps S408 to S411 in FIG. 22), in the case where image abnormalities are applied in any of the subsequent jobs to the regions on which the image abnormalities are made not to exist (YES at Step S410 in FIG. 22), the image forming action (job) can be continued by avoiding the image abnormalities by the subsequent job as shown in FIG. 16. Accordingly, the control section 101 controls to stop the current job in the image forming apparatus 100 and the sheet processing apparatus 200, and controls to start the execution of the subsequent job which can be output without the appearing of image abnormalities (Step S412 in FIG. 22).

In this case, on the operation screen 103G which the control section 101 displays on the operation display section 103, an abnormality detection screen 103Ga2 (refer to FIG. 23) may be displayed.

Figure 23:
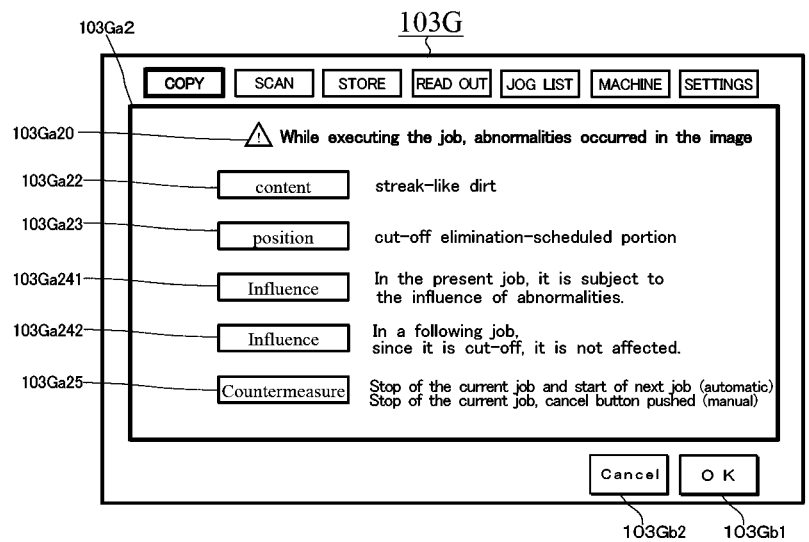
FIG. 23 is an explanatory diagram showing an example of a screen at the time of acting of an image forming system of the embodiment of the present invention.

On the display screen 103G shown in FIG. 23, the following items are indicated,

Message as to abnormality occurrence (103Ga20 in FIG. 23),

Indication of Description about the content of abnormality (103Ga22 in FIG. 23), Indication of Description about the position of abnormality (103Ga23 in FIG. 23), Indication of Influence for a current job due to abnormality (103Ga241 in FIG. 23), Indication of Influence for a subsequent job due to abnormality (103Ga242 in FIG. 23), and Indication of Countermeasure for abnormality (103Ga25 in FIG. 23).

With this, a subsequent job can be made to continue without stopping the image forming action while awakening a user's attention for the occurrence of abnormality. As a result, it becomes possible to control image formation by detecting image abnormalities appropriately in accordance with the state of output matters by sheet processing. Further, a user can be notified of the matter that a current job is switched to a subsequent job. Furthermore, when a user who does not desire passing of a job presses down a cancellation button 103Gb2 in FIG. 23, it becomes possible to stop the image forming action without shifting automatically to a subsequent job (Step S405 in FIG. 22).

In the following setting conditions that a setting is made to change the control state of each of the image forming action and the sheet processing action based on the results of abnormality detection (YES at Step S401 in FIG. 22), that although sheet processing is executed (YES at Step S404 in FIG. 22), image abnormalities are not applied to regions on which image abnormalities are made not to exist (NO at Step S406 in FIG. 22), that a pass setting is not set up (NO at Step S407 in FIG. 22), and that a job transfer setting is not set up (NO at Step S413 FIG. 22), the control section 101 judges whether an image abnormality exists on a region where the image abnormality does not becomes a problem (Step S417 in FIG. 22). In the above, the state that an image abnormality does not becomes a problem means a state that an image abnormality disappears by being hidden with punches, staples, wrap-bookbinding, or the like.

Here, when an image abnormality exists on regions other than regions where an image abnormality does not becomes a problem (NO at Step S417 in FIG. 22), since a measure to continue a job by avoiding the image abnormality does not exist, the control section 101 controls to stop the execution of the job in the image forming apparatus 100 and the sheet processing apparatus 400 (step S416 in FIG. 22).

On the other hand, when an image abnormality exists on regions where an image abnormality does not becomes a problem (YES at Step S417 in FIG. 22), the control section 101 checks whether a setting to perform notification about image abnormalities is set up (Step S418 in FIG. 22). Here, the setting to perform notification means that specific information is set to be notified to a user through an indication screen on the operation display section 103, and the matter that a job is continued due to the reasons that an image abnormality exists on a region where the image abnormality does not becomes a problem is selected in initial setting as the specific information so as to be notified to a user.

Further, when the setting to perform notification is not set up (NO at Step S418 in FIG. 22), the control section 101 checks whether a setting is made to complete the action in the currently-executed job in which image abnormality are detected (Step S419 in FIG. 22).

On the other hand, in the case where an image abnormality exists on a region where the image abnormality does not becomes a problem (YES at Step S417 in FIG. 22), when a setting to notify image abnormalities is set up (YES at Step S418 in FIG. 22), or when a setting is not set up to complete the action in the currently-executed job in which image abnormalities are detected (NO at Step S419 in FIG. 22), the control section 101 notifies that image abnormalities occur (refer to FIG. 24) and controls to continue the action for the current action and also for a subsequent job (Step S420 in FIG. 22).

In this case, on the operation screen 103G which the control section 101 displays on the operation display section 103, an abnormality detection screen 103Ga2 (refer to FIG. 24) is displayed. On the display screen 103G shown in FIG. 24, the following items are indicated, Message as to abnormality occurrence (103Ga20 in FIG. 24), Indication of Description about the content of abnormality (103Ga22 in FIG. 24), Indication of Description about the position of abnormality (103Ga23 in FIG. 24), Indication of Influence for a current job due to abnormality (103Ga24 in FIG. 24), and Indication of Countermeasure for abnormality (103Ga25 in FIG. 24).

With this, a subsequent job can be made to continue without stopping the image forming action while awakening a user's attention for the occurrence of abnormality. Further, it becomes possible to control image formation by detecting image abnormalities appropriately in accordance with the state of output matters by sheet processing. Furthermore, a user can be notified of the matter that the action is continued.

Figure 24:
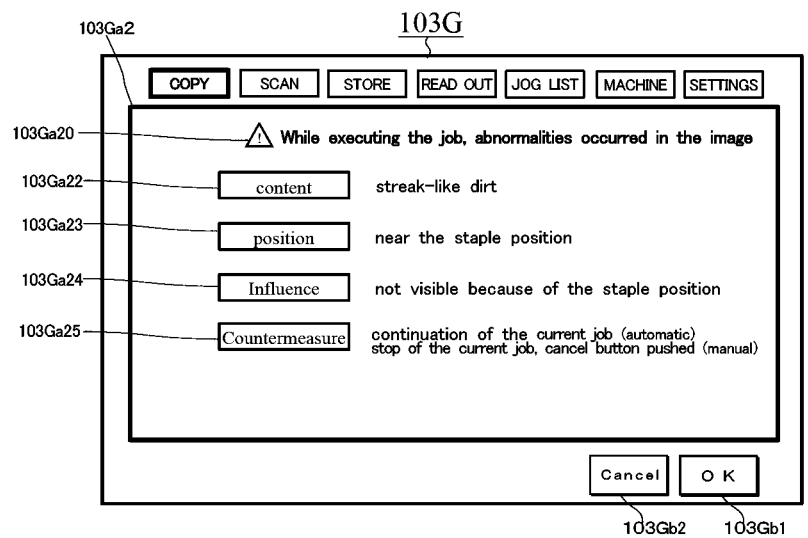
FIG. 24 is an explanatory diagram showing an example of a screen at the time of acting of an image forming system of the embodiment of the present invention.

Moreover, when a user who does not desire continuation of a job presses down a cancellation button 103Gb2 in FIG. 24, it becomes possible to stop the image forming action without performing the continuation of the job (Step S416 in FIG. 22).

Further, in the case where an image abnormality exists on a region where the image abnormality does not becomes a problem (YES at Step S417 in FIG. 22), when a setting to notify image abnormalities is not set up (NO at Step S418 in FIG. 22), and when a setting is set up to complete the action in the currently-executed job in which image abnormalities are detected (YES at Step S419 in FIG. 22), the control section 101 controls to stop the image forming action after having completed the output of the job (Step S421 in FIG. 22).

In this case, on the operation screen 103G which the control section 101 displays on the operation display section 103, an abnormality detection screen 103Ga2 (refer to FIG. 25) may be displayed.

On this abnormality detection screen 103Ga2 (refer to FIG. 25), in addition to the same contents with those in each of the abnormality detection screens FIG. 23 and FIG. 24, in the indication of countermeasure for abnormalities (103Ga25 in FIG. 25), it is indicated that the action of the image forming apparatus is stopped by a setting after the current job has be completed, with which it becomes possible to notify a user of the stop of the action of the image forming apparatus.

As mentioned above, in the case where the image forming apparatus 100 has a function to compare image data for image formation at the time of forming an image on a sheet with read-out image data produced at the in-line sensor section 320 by reading the sheet and to detect image abnormalities from the comparison result, when an image abnormality is detected, the control state of the image forming action is changed ("continuation of the job", "stop of the job", "stop of the current job and transfer of the job to another apparatus", "stop of the current job and start of an output possible subsequent job", "stop of the job after having output the job", and "notification and continuation of the job") in response to sheet processing executed at the sheet processing apparatus 400. With this, it becomes possible to control image formation by detecting image abnormalities appropriately in accordance with the state of output matters by sheet processing such as cutting, punching, stapling, and wrap-bookbinding.

Therefore, in the case where image abnormalities are detected in the state of being no problem as a final output matter, by controlling not to stop the image forming action, it becomes possible to prevent useless down time and slowdown of productivity.

Further, with regard to abnormalities on a region which is eliminated by being cut off with cutting and abnormalities on a region on which it can be judged that the abnormalities do not become problems due to the reasons that the abnormalities are made to disappear with punches, staples, wrap-bookbinding, or the like, by continuing the image forming action in accordance with the situation of sheet processing without stopping, it becomes possible to control image formation by detecting image abnormalities appropriately in accordance with the state of output matters by sheet processing.

With regard to abnormalities on a region on which the abnormalities do not become problems, at the time of continuing the image forming action without stopping, the abnormalities are notified via the notifying section. With this, it becomes possible to awaken attention, and it becomes possible to control image formation by detecting image abnormalities appropriately in accordance with the state of output matters by sheet processing.

With regard to abnormalities on a region on which the abnormalities do not become problems, at the time of continuing the image forming action without stopping, the image forming action is made to stop after the image forming action has been completed. With this, it becomes possible to keep the condition of the image forming apparatus appropriate.

Further, in the case where detected abnormalities exist on a sheet after having been subjected to sheet processing and the abnormalities exist on a region which causes problems, the image forming action is made to stop. With this, it becomes possible to control image formation by detecting image abnormalities appropriately in accordance with the state of output matters by sheet processing.

Moreover, in the case where detected image abnormalities remain and appear on a sheet after having been subjected to sheet processing in a currently-executed job, when image abnormalities do not appear on a sheet after having been subjected to sheet processing in a subsequent job, the currently-executed job is suspended and the image forming action of the subsequent job is made to be executed preferentially. With this, it becomes possible to continue the image forming action in accordance with the condition of the image forming apparatus without stopping. Accordingly, it becomes possible to control image formation by detecting image abnormalities appropriately in accordance with the state of output matters by sheet processing.

Further, in the case where detected abnormalities exist on a region which does not causes a problem on a sheet after having been subjected to sheet processing, it is controlled based on a instruction of a user whether the image forming action is continued or stopped. With this, the abnormalities are made to disappear with a region eliminated by being cut off with cutting, punches, staples, wrap-bookbinding, or the like. Accordingly, with regard to abnormalities existing on a region on which the abnormalities are made to disappear, on the condition of obtaining the permission of a user, the image forming action can be continued without stopping, whereby it becomes possible to control image formation by detecting image abnormalities appropriately in accordance with the state of output matters by sheet processing.

Further, in the case where the image forming apparatus is connected so as to communicate with another image forming apparatus capable of executing an image forming action and sheet processing and a series of image formation is handled as a job, a job in which abnormalities are detected during execution is transferred to the another image forming apparatus. With this, the image forming action can be continued in the another image forming apparatus, whereby it becomes possible to control image formation by detecting image abnormalities appropriately in accordance with the state of output matters by sheet processing.

Furthermore, with regard to the job in which abnormalities have been detected during execution, recovery information showing the position at which the processing is suspended due to the abnormalities is transferred together with the job to the another image forming apparatus.

With this, the image forming action can be continued in the another image forming apparatus from the position at which the processing is suspended due to the abnormalities, whereby it becomes possible to control image formation by detecting image abnormalities appropriately in accordance with the state of output matters by sheet processing.

Other Embodiments

As mentioned above, although the embodiments of the present invention have been described based on the drawings, the specific constitutions and numeric values should not be restricted to those shown in the embodiments. That is, if modification and addition are made so as not to deviate from a range of intention of the present invention, the modification and the addition are included in the present invention.

In the above description of the embodiments, the control section 101 in the image forming apparatus 100 plays a center role to control the processing. However, the present invention should not be limited to this. For example, any one of the respective control sections 301 and 401 of the apparatuses 300 and 400 other than the image forming apparatus 100 may give an instruction to the other control sections to perform the control at the time of the above-mentioned processing so as to execute the same processing as the above processing as the whole of the image forming system.

In the embodiments shown above, the image forming apparatus 100 and the sheet processing apparatus 400 are connected to each other via online. However, the present invention should not be limited to this. For example, the image forming apparatus 100 and the sheet processing apparatus 400 may be constituted to be connected via offline or nearline. In that case, the control section 101 can acquire the sheet processing information in a JDF (Job Definition Format) format.

Figure 25:
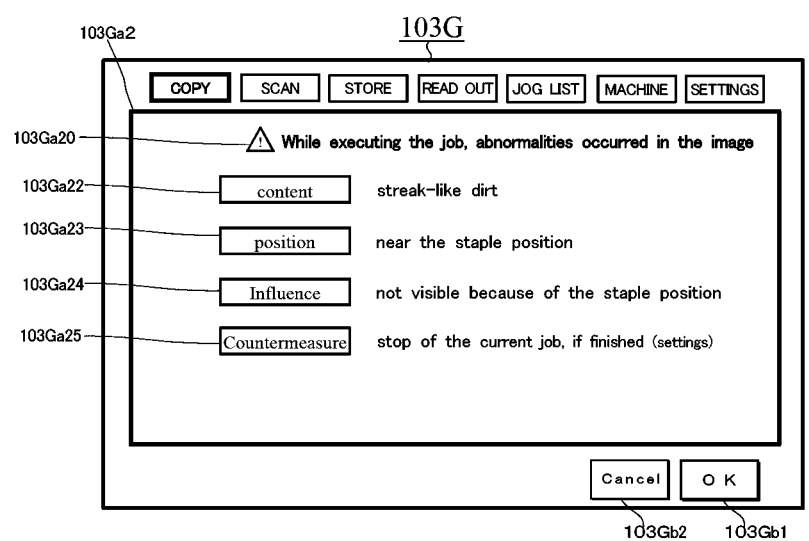
FIG. 25 is an explanatory diagram showing an example of a screen at the time of acting of an image forming system of the embodiment of the present invention.

Moreover, each of FIG. 23 to FIG. 25 shows one example of the abnormality detection screen. In addition to this, at the time of stopping a jog, the cause of the stopping may be notified. Here, examples of the cause of the stopping include occurrence of abnormalities on a problematic region, nonexistence of another image forming apparatus to which a job is to be transferred, and the like.

What is claimed is:

1. An image forming apparatus comprising:
    an image forming section which forms an image on a sheet based upon image data; and
    a control section which controls image formation at the image forming section;
    wherein the image forming apparatus is constituted to be connectable to a reading apparatus which is located downstream from the image forming section in a direction in which the sheet is conveyed and reads out the image formed on the sheet by the image forming section based on the image data and to a sheet processing apparatus to apply sheet processing to the sheet on which an image is formed at the image forming section; and
    wherein the control section is configured to perform the following operations:
        comparing the image data for image formation on the sheet by the image forming section with read-out image data read by the reading of the image formed on the sheet with the reading apparatus;
        detecting an existence of an image abnormality on the sheet from a result of the comparison of the image data for the image formation on the sheet by the image forming section with the read-out image data of the image formed on the sheet read by the reading apparatus; and
        changing a control of an image formation by the image forming section in accordance with the sheet processing executed at the sheet processing apparatus when the image abnormality has been detected.

2. The image forming apparatus described in claim 1, wherein the image forming apparatus includes the reading apparatus.

3. The image forming apparatus described in claim 1, wherein when the sheet processing to the sheet hides the detected image abnormality on the sheet from the outer appearance of the sheet, the control section continues the image forming action.

4. The image forming apparatus described in claim 3, wherein when the sheet processing to the sheet hides the detected image abnormality on the sheet from the outer appearance of the sheet, the control section controls based on an instruction of a user whether to continue the image forming action.

5. The image forming apparatus described in claim 1, wherein the image forming apparatus further includes a notifying section to perform notices, and when the sheet processing to the sheet hides the detected image abnormality from an outer appearance of the sheet, the control section notifies an existence of the image abnormality via the notifying section and then continues the image forming action.

6. The image forming apparatus described in claim 4, wherein the control section stops the image forming action after the image forming action has been completed.

7. The image forming apparatus described in claim 1, wherein in the case where a series of image formations is handled as a job, when the sheet processing to a preceding sheet in a currently executed job does not hide the detected image abnormality from an outer appearance of the precedence sheet, and when the sheet processing to a subsequent sheet in a subsequent job hides a correspondent position on the subsequent sheet from an outer appearance of the subsequent sheet, the correspondent position corresponding to the position of the detected image abnormality on the precedence sheet, the control section suspends the currently-executed job and controls the image forming section to execute the image forming action of the subsequent job preferentially.

8. The image forming apparatus described in claim 1, wherein in the case where the image forming apparatus is connected to be able to communicate with another image forming apparatus capable of executing an image forming action and sheet processing and a series of image formation is handled as a job, the control section transfers a job in which an abnormality has been detected during execution to the another image forming apparatus.

9. The image forming apparatus described in claim 8, wherein for the job in which an abnormality has been detected during execution, the control section transfers recovery information indicating a position at which the job has been suspended due to the abnormality together with the job to the another image forming apparatus.

10. The image forming apparatus described in claim 1, wherein the control section changes in accordance with the sheet processing a region for which a process of detecting an abnormality is performed.

11. An image forming system comprising:
    the image forming apparatus which is described in claim 1, includes the image forming section and the control section, and is constituted to be connectable to the reading apparatus and the sheet processing apparatus;
    a reading apparatus to read out an image formed on the sheet by the image forming section; and
    a sheet processing apparatus to apply various kinds of sheet processing to the sheet on which an image is formed at the image forming apparatus.

12. The image forming apparatus described in claim 1, wherein the control section changes the control in accordance with a relation between the image abnormality on the sheet and the sheet processing by the sheet processing apparatus.

13. The image forming apparatus described in claim 1, wherein the control section changes the control in accordance with a position of the detected image abnormality on the sheet and an outer appearance of the sheet after the sheet processing by the sheet processing apparatus.

14. The image forming apparatus described in claim 1, wherein when sheet processing to the sheet eliminates the detected image abnormality from the sheet or resolves a problem on an outer appearance of the sheet, the problem being caused by the detected abnormality on the sheet, the control section continues the image forming action.

15. The image forming apparatus described in claim 1, wherein the sheet processing apparatus comprises a cutting section which cuts out an end portion of the sheet, and wherein when the detected image abnormality on the sheet is on the end portion of the sheet to be cut out by the cutting section, the control section continues the image forming action.

16. A method of controlling an image forming apparatus which comprises:
    an image forming section which forms an image on a sheet based upon image data; and
    a control section which controls image formation at the image forming section;
    wherein the image forming apparatus is constituted to be connectable to a reading apparatus which is located downstream from the image forming section in a direction in which the sheet is conveyed and reads out the image formed on the sheet by the image forming section based on the image data and to a sheet processing apparatus to apply sheet processing to the sheet on which an image is formed at the image forming section;

the method comprising the steps of:
- comparing the image data for image formation on the sheet by the image forming section with read-out image data read by the reading of the image formed on the sheet with the reading apparatus;
- detecting an existence of an image abnormality on the sheet by referring to a result of the comparison of the image data for the image formation on the sheet by the image forming section with the read-out image data of the image formed on the sheet read by the reading apparatus; and
- changing a control of an image formation by the image forming section in accordance with the sheet processing executed at the sheet processing apparatus when the image abnormality has been detected.

17. The method described in claim 16, wherein when the sheet processing to the sheet hides the detected image abnormality from an outer appearance of the sheet, the control section continues the image forming action.

18. The method described in claim 17, wherein the control section stops the image forming action after the image forming action has been completed.

19. The method described in claim 16, wherein when the sheet processing to the sheet hides the detected image abnormality from an outer appearance of the sheet, the control section notifies an existence of the image abnormality and then continues the image forming action.

20. The method described in claim 16, wherein in the case where a series of image formations is handled as a job, when the sheet processing to a preceding sheet in a currently executed job does not hide the detected image abnormality from an outer appearance of the precedence sheet, and when the sheet processing to a subsequent sheet in a subsequent job hides a correspondent position on the subsequent sheet from an outer appearance of the subsequent sheet, the correspondent position corresponding to the position of the detected image abnormality on the precedence sheet, the control section suspends the currently-executed job and controls the image forming section to execute the image forming action of the subsequent job preferentially.

21. The method described in claim 16, wherein when the sheet processing to the sheet hides the detected image abnormality on the sheet from the outer appearance of the sheet, the control section controls based on an instruction of a user whether to continue the image forming action.

22. The method described in claim 16, wherein a region for which a process of detecting an abnormality is performed is changed in accordance with the sheet processing.

* * * * *